No. 837,592. PATENTED DEC. 4, 1906.
L. STANGE.
APPARATUS FOR CONCENTRATING SULFURIC ACID.
APPLICATION FILED SEPT. 13, 1906.
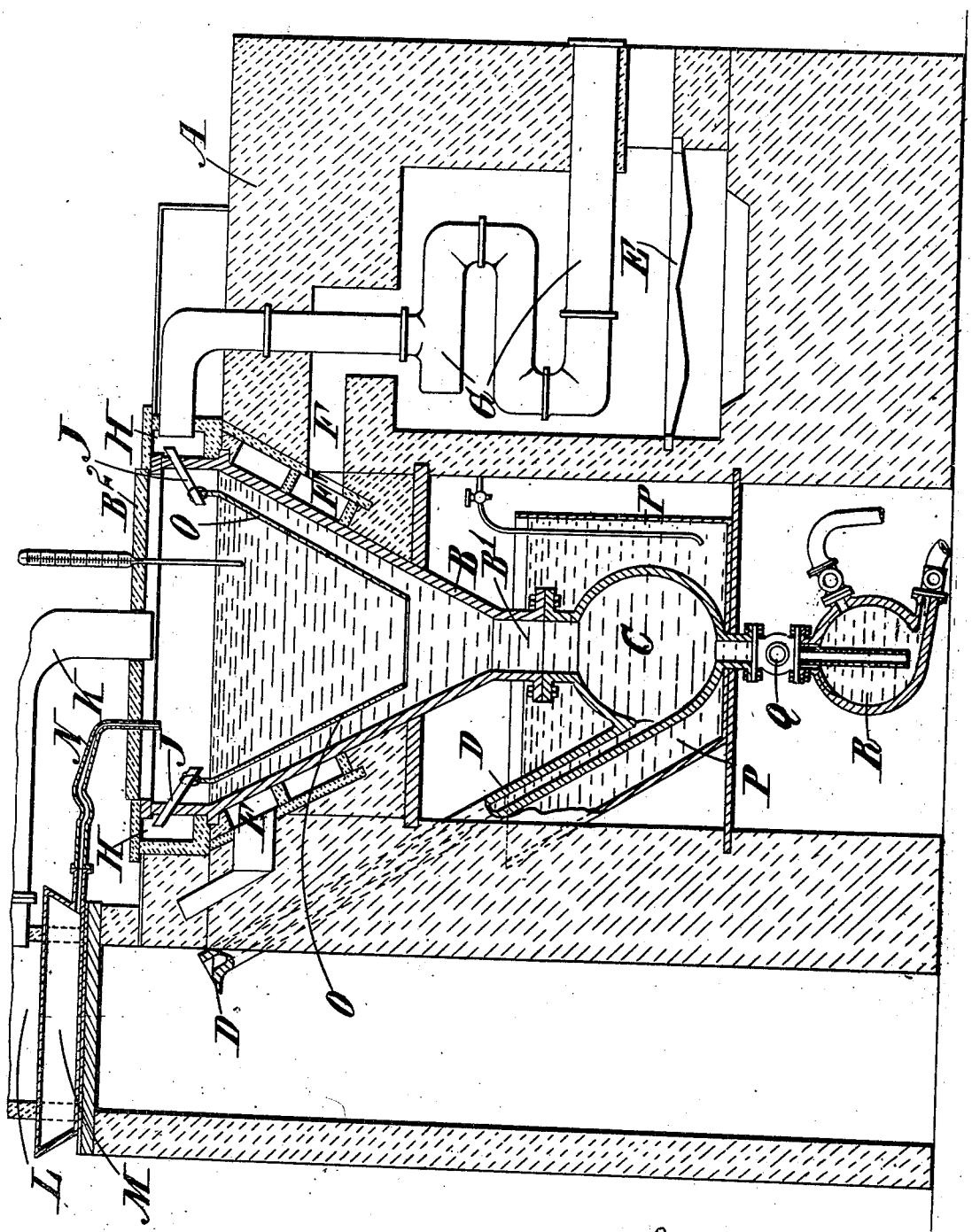

UNITED STATES PATENT OFFICE.

LOUIS STANGE, OF AIX-LA-CHAPELLE, GERMANY.

APPARATUS FOR CONCENTRATING SULFURIC ACID.

No. 837,592.

Specification of Letters Patent.

Patented Dec. 4, 1906.

Application filed September 13, 1906. Serial No. 334,535.

*To all whom it may concern:*

Be it known that I, LOUIS STANGE, a subject of the German Emperor, residing at Aix-la-Chapelle, Germany, have invented certain new and useful Improvements in Apparatus for Concentrating Sulfuric Acid, of which the following is a specification.

This invention relates to improvements in apparatus for concentrating sulfuric acid of the type in which the concentration is effected in cast-iron pans by blowing hot air over the surface and by heating the pans.

According to this invention the cast-iron concentrating vessel is provided with means for blowing heated air over the surface of the liquid in the vessel and with means for heating the outside of the upper part of the vessel. The vessel has a conduit near its lower end which communicates with a chamber beneath, and means are provided for cooling the chamber for the purpose of preventing incrustations. An inner vessel having an opening at its lower end is suspended within the upper part of the containing vessel and is formed of acid-proof stoneware, the arrangement being such that the dilute acid passes down through the stoneware inner vessel and only when concentrated passes into the space between the inner stoneware vessel and the outer cast-iron vessel. The lower chamber, which is cold and which receives the precipitate from the containing vessel, is provided with a valve-controlled opening for the discharge of the precipitate therefrom.

The invention will be more particularly described with reference to the accompanying drawing, which represents in vertical section one form of concentrating apparatus embodying this invention.

Within a brickwork foundation A is mounted a cast-iron pan B, of conical form, having an outlet B' at its lower end leading to a chamber C, connected with an outlet-tube D for concentrated acid.

Contrary to the hitherto-known methods of concentrating sulfuric acid in cast-iron pans by heating from the bottom, the pan according to this invention is heated from the outside near the top. For this purpose a furnace E is provided with flues F, which pass round the outside of the upper part of the vessel B. Above the furnace E are arranged air-heating pipes G, from which the hot air passes to an annular hot-air-distributing chamber H, surrounding the top of the containing vessel, covered by a lid of stoneware $B^2$. From the chamber H a number of distributing-pipes J, (say six,) made of acid-proof artificial stone, are directed onto the surface of the acid contained within the vessel B, and the main part of the concentration is effected by the current of hot air thus produced over the surface of the acid.

The gases escaping from the surface and containing dilute acid and watery vapor are conducted by a pipe K, passing through the lid $B^2$, into a Glover tower or similar chamber L, where they serve to impart a preliminary heating to the dilute acid, which runs from the pan M at the bottom of the tower L through the pipe N into the concentrating vessel.

At the upper part of the concentrating vessel B is arranged an inner vessel O, which corresponds in shape with the outer vessel B and is constructed of acid-proof stoneware. This vessel O is suspended—say by platinum connections—from the distributing-pipes J, which convey the hot air to the surface of the acid contained within the vessel O.

Surrounding the lower chamber C is a tank P, through which is circulated cooling-water to maintain the chamber C continuously cool. At the bottom of the chamber C is a cock Q, through which the sludge from the bottom of the chamber C can pass into a sludge-receptacle R.

When the apparatus is first put into operation, the pan B is filled with strong acid near to the top. The air in the pipes G is heated by the furnace E, and by the action of the Glover tower or other chimney the air is sucked through the distributing-chamber H and the pipes J and K. At the same time the hot gases from the furnace pass through the flues F, surrounding the upper part of the vessel B, and assist in heating the contents. In the meantime the bottom chamber C is kept cool by circulating cold water in the tank P. When the acid on the top has reached its boiling-point, a certain quantity of dilute acid is allowed to run down into the inner vessel O through the pipe N from the pan M. This dilute acid remaining at the top of the inner vessel O displaces a corresponding quantity of the concentrated acid in the chamber C through the overflow-pipe D. Heating of the acid at the top and cooling at the bottom is continued until concentration is perfected, and the operation of the apparatus is then a continuous one.

The suspended inner vessel O prevents the dilute acid from coming into contact with the cast-iron of the pan B, and as there is no ebullition from the bottom of the pan the dilute acid does not mix with the acid already concentrated.

Hitherto it has been suggested to employ within a cast-iron concentrating-pan an inner vessel of acid-resisting material standing upright on the bottom of the pan which was heated from the bottom; but such an arrangement gave rise to the objection that the inner vessel was caused to jump by the action of the heat, an effect which is avoided according to this invention by the arrangement of the inner vessel O, suspended at the upper part of the containing vessel B.

The effect of the arrangement constituting this invention is to produce a practically perfect continuity of the concentration. In all apparatus for concentrating sulfuric acid in cast-iron vessels a precipitate or sludge consisting of ferric sulfate is produced, and in pans which are heated from the bottom this precipitate results in the formation of incrustations. According to this invention the sludge is kept in liquid state near the bottom of the chamber C on account of the cooling thereof, and the sludge of ferric sulfate mixed with some concentrated acid can pass through the cock Q when required into the sludge-receptacle R, and as the sludge is cold this method of removing it does not necessitate any interruption in the working of the apparatus, which has always been necessary in the forms of cast-iron concentration apparatus hitherto used, which required to be repeatedly cleaned.

As a result of the cooling of the acid at the bottom of the apparatus it is possible to construct the concentrating vessel B and the chamber C in two castings connected by a flange, so that the upper part B when eaten by the acid can be replaced, while the lower part C serves for a very long time. As only the acid to be concentrated is heated and as incrustations are rendered impossible, the result is a great saving of fuel.

It is to be understood that the details of construction of the apparatus may be varied without departing from this invention.

What I claim as my invention, and desire to secure by Letters Patent, is—

1. In an apparatus for concentrating sulfuric acid the combination of a liquid-containing vessel, a chamber communicating with its lower part, means for blowing heated gas over the surface of the liquid, means for heating the upper part of the containing vessel externally and means for cooling said chamber.

2. In an apparatus for concentrating sulfuric acid the combination of a liquid-containing vessel, a chamber communicating with its lower part, means for blowing heated gas over the surface of the liquid, means for heating the upper part of the containing vessel externally, means for cooling said chamber and an inner vessel having an opening at its lower end suspended within the upper part of said containing vessel.

3. In an apparatus for concentrating sulfuric acid the combination of a liquid-containing vessel, a chamber communicating with its lower part, means for blowing heated gas over the surface of the liquid, means for heating the upper part of the containing vessel externally, means for cooling said chamber and a valve-controlled opening from the chamber for the discharge of sludge therefrom.

4. In an apparatus for concentrating sulfuric acid the combination of a liquid-containing vessel, a chamber communicating with its lower part, means for blowing heated gas over the surface of the liquid, means for heating the upper part of the containing vessel externally, means for cooling said chamber, an inner vessel having an opening at its lower end suspended within the upper part of said containing vessel and a valve-controlled opening from the chamber for the discharge of sludge therefrom.

5. In an apparatus for concentrating sulfuric acid the combination of a cast-iron concentrating-pan having an outlet at the bottom, a chamber communicating with the outlet, a tank through which cooling-water is circulated surrounding said chamber, a furnace, heating-channels supplied with hot gases from the furnace and surrounding the upper part of the pan, air-heating pipes above the furnace, an annular hot-air-distributing conduit round the top of the pan connected to said air-heating pipes, and tubes leading from said annular conduit to direct hot air onto the liquid in the pan.

6. In an apparatus for concentrating sulfuric acid the combination of a cast-iron concentrating-pan having an outlet at the bottom, a chamber communicating with the outlet, a tank through which cooling-water is circulated surrounding said chamber, a furnace, heating-channels supplied with hot gases from the furnace and surrounding the upper part of the pan, air-heating pipes above the furnace, an annular hot-air-distributing conduit round the top of the pan connected to said air-heating pipes, tubes leading from said annular conduit to direct hot air onto the liquid in the pan and an inner vessel having an opening at its lower end constructed of acid-proof material corresponding in shape with the pan and suspended in the upper part of the pan.

7. In an apparatus for concentrating sulfuric acid the combination of a cast-iron concentrating-pan having an outlet at the bottom, a chamber communicating with the outlet, a tank through which cooling-water is circulated surrounding said chamber, a furnace, heating-channels supplied with hot gases from the furnace and surrounding the upper part of the pan, air-heating pipes above the furnace, an annular hot-air-distributing conduit round the top of the pan connected to said air-heating pipes, tubes leading from said annular conduit to direct hot air onto the liquid in the pan, and an inner vessel having an opening at its lower end constructed of acid-proof material corresponding in shape with the pan and suspended in the upper part of the pan from the hot-air-distributing pipes.

8. In an apparatus for concentrating sulfuric acid the combination of a cast-iron concentrating-pan having an outlet at the bottom, a chamber communicating with the outlet, a tank through which cooling-water is circulated surrounding said chamber, a furnace, heating-channels supplied with hot gases from the furnace and surrounding the upper part of the pan, air-heating pipes above the furnace, an annular hot-air-distributing conduit round the top of the pan connected to said air-heating pipes, tubes leading from said annular conduit to direct hot air onto the liquid in the pan, an outlet from the cooled chamber, a cock in said outlet and a sludge-receptacle communicating with said outlet.

9. In an apparatus for concentrating sulfuric acid the combination of a conical cast-iron concentrating-pan having an outlet at the bottom a chamber communicating with the outlet and forming a separate casting from the pan, a tank through which cooling-water is circulated surrounding said chamber, a furnace, heating-channels supplied with hot gases from the furnace and surrounding the upper part of the pan, air-heating pipes above the furnace, an annular hot-air-distributing conduit round the top of the pan connected to said air-heating pipes, tubes leading from said annular conduit to direct hot air onto the liquid in the pan, an inner vessel having an opening at its lower end constructed of acid-proof material, corresponding in shape with the pan and suspended in the upper part of the pan from the hot-air-distributing tubes, an outlet from the cooled chamber, a cock in said outlet and a sludge-receptacle communicating with said outlet.

In testimony whereof I have signed my name to this specification in the presence of two subscribing witnesses.

LOUIS STANGE.

Witnesses:
HENRY SHOETENSOCK,
HERBERT BURRAGE.